United States Patent
Hailey, Jr. et al.

(10) Patent No.: US 8,960,301 B2
(45) Date of Patent: Feb. 24, 2015

(54) COMPLETING UNDERWATER WELLS

(75) Inventors: Travis Thomas Hailey, Jr., Sugar Land, TX (US); Thurman Philip Harrell, Dallas, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 729 days.

(21) Appl. No.: 13/214,964

(22) Filed: Aug. 22, 2011

(65) Prior Publication Data
US 2013/0048294 A1 Feb. 28, 2013

(51) Int. Cl.
| | | |
|---|---|---|
| E21B 17/01 | (2006.01) | |
| E21B 19/00 | (2006.01) | |
| E21B 33/035 | (2006.01) | |
| E21B 41/00 | (2006.01) | |
| E21B 19/24 | (2006.01) | |

(52) U.S. Cl.
CPC ............ *E21B 19/004* (2013.01); *E21B 33/035* (2013.01); *E21B 41/0014* (2013.01); *E21B 17/012* (2013.01); *E21B 19/24* (2013.01)
USPC ........... 166/341; 166/349; 166/350; 166/352; 405/168.1; 405/224.2

(58) Field of Classification Search
CPC .............................. E21B 17/015; E21B 17/017
USPC ................ 166/341, 338, 349, 350, 352, 77.1, 166/85.5, 241.1; 405/168.1, 168.2, 224.2
See application file for complete search history.

(56) References Cited

U.S. PATENT DOCUMENTS

| | | | |
|---|---|---|---|
| 2,783,027 A * | 2/1957 | Gilbert ............................ 175/5 | |
| 4,053,022 A | 10/1977 | Mercier | |
| 4,223,737 A * | 9/1980 | O'Reilly ...................... 166/336 |
| 5,011,333 A * | 4/1991 | Lanan ........................... 405/166 |
| 5,749,676 A * | 5/1998 | Head .............................. 405/171 |
| 6,390,731 B1 * | 5/2002 | Van Gelder .................. 405/166 |
| 6,843,321 B2 | 1/2005 | Carlsen |
| 7,845,412 B2 * | 12/2010 | Sbordone et al. ............. 166/368 |
| 2002/0177375 A1 * | 11/2002 | Cottrell et al. .................... 441/5 |
| 2006/0231264 A1 | 10/2006 | Boyce et al. |
| 2008/0314598 A1 | 12/2008 | Rodrigues et al. |

(Continued)

FOREIGN PATENT DOCUMENTS

| | | |
|---|---|---|
| GB | 2471531 | 1/2011 |
| WO | WO 2006/088372 A1 | 8/2006 |

OTHER PUBLICATIONS

Notification of Transmittal of the International Search Report and the Written Opinion of the International Searching Authority, or Declaration (2 pages); International Search Report (3 pages); and Written Opinion of the International Searching Authority (7 pages), mailed Feb. 26, 2013, for international application PCT/US2012/049733.

(Continued)

*Primary Examiner* — Matthew Buck
(74) *Attorney, Agent, or Firm* — Anthony Iannitelli; Fish & Richardson, P.C.

(57) ABSTRACT

An underwater well is completed by extending an elongate stinger laterally outward from a vessel positioned at the water surface. The stinger is extended to curve downward toward a wellhead of the well. A well completion string is deployed from the vessel on the stinger while supporting the completing string to curve outward and downward from the vessel toward the wellhead. The completion string is then guided into the wellhead.

22 Claims, 6 Drawing Sheets

(56) References Cited

U.S. PATENT DOCUMENTS

| | | | |
|---|---|---|---|
| 2009/0260830 A1* | 10/2009 | Hansen | 166/339 |
| 2010/0038091 A1 | 2/2010 | Sack | |
| 2010/0047040 A1 | 2/2010 | Burgess et al. | |
| 2010/0059230 A1* | 3/2010 | Skeels | 166/360 |
| 2010/0116507 A1 | 5/2010 | Haugland | |
| 2011/0168400 A1 | 7/2011 | Machin et al. | |
| 2011/0290499 A1* | 12/2011 | Petegem et al. | 166/350 |

OTHER PUBLICATIONS

Authorized Officer Agnes Wittmann-Regis, PCT International Preliminary Report on Patentability, PCT/US2012/049733, Mar. 6, 2014, 9 pages.

Notification of Transmittal of the International Search Report and the Written Opinion of the International Searching Authority, or Declaration (2 pages); International Search Report (3 pages); and Written Opinion of the International Searching Authority (7 pages), mailed Mar. 26, 2013, for international application PCT/US2012/049733.

Expro, "AX-S™" (8 pages).

FMC Technologies "Well Intervention Services" http://www.fmctechnologies.com/SubseaSystems/Technologies/AdvancingTechnologies/Int, Jul. 1, 2011 (1 page).

Fugro-TSM, "AX-S System" http://www.tsmarine.net/ax-s-well-intervention-system.html, Jul. 1, 2011 (3 pages).

Havila Phoenix Schematic (1 page).

Erling Mathiassen et al., "Well Intervention in Deep Waters" Offshore Technology Conference, OTC 19552, Copyright 2008 (13 pages).

C.D. Bridge et al., "Spoolable Compliant Guide—A Solution for Well Intervention" Offshore Technology Conference, OTC 20416, Copyright 2010 (8 pages).

Peter Nellesen et al., "Development of a Deepwater Subsea Well Intervention Package Control System" Offshore Technology Conference, OTC 20438, Copyright 2010 (10 pages).

C. Drange, "Bringing Wireline and Coiled Tubing to New Frontiers on a Light Well Intervention Unit" SPE International, SPE 130522, Copyright 2010 (9 pages).

L. Fjaertoft et al. "Success from Subsea Riserless Well Interventions" SPE International, SPE 143296, Copyright 2011 (9 pages).

K.I. Torgersen, "New Innovative Top-Side Solutions to Provide Beneficial Offshore Well Intervention" SPE International, SPE 143339, Copyright 2011 (9 pages).

FMC Technologies, "Light Well Intervention" 2008 (8 pages).

* cited by examiner

COMPLETING UNDERWATER WELLS

BACKGROUND

Underwater wells, such as subsea wells, wells at the bottom of lakes or rivers, or wells in other bodies of water, are typically drilled, cased and completed from a drilling rig at the surface. The worldwide supply of drilling rigs, particularly deep water capable rigs, however, is limited. As a result, the rigs are not only expensive to hire, they are tightly scheduled. The cost to hire a rig is a function of many factors, including the duration the rig must be on site at the well. Therefore, reductions in rig time in drilling and completing an underwater well can reduce the cost of the well significantly, as well as ease rig scheduling.

SUMMARY

The present disclosure relates to completing an underwater well, for example, a subsea well, a well at the bottom of a lake or river, and/or a well in another body of water.

In certain aspects an elongate stinger is extended laterally outward from a vessel positioned at the water surface. The stinger is extended to curve downward toward a wellhead of the well. A well completion string is deployed from the vessel on the stinger while being supported by the stinger to curve outward and downward from the vessel toward the wellhead. The completion string is then guided into the wellhead.

In certain aspects, a system for completing a well includes a vessel that floats on a water surface. The vessel has an elongate stinger that, when assembled, extends laterally outward from the vessel and curves downward into the water toward a wellhead of the well. The system includes an elongate well completion string. The completion string includes, among other things, tubing and a tubing hanger for coupling with the wellhead. The stinger is adapted to support the well completion string as the well completion string is deployed from the vessel into the water toward the wellhead.

In certain aspects a well string is supported, from a vessel positioned at a surface of a body of water, against bending stress greater than a specified bending stress. The well string is of a type configured to complete an underwater well. The well string is lowered towards a wellhead of the underwater well while being supported against bending stress greater than the specified bending stress. The well string is stabbed into the wellhead and coupled to the wellhead.

The details of one or more embodiments are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

The present disclosure relates to completing an underwater well, for example, a subsea well, a well at the bottom of a lake or river, and/or a well in another body of water. While applicable to underwater wells in general, the concepts herein are particularly suited for deep water underwater wells, i.e., wells at water depths too deep to reach and service with human divers (near and beyond 1000 feet/305 meters).

Figure 1:
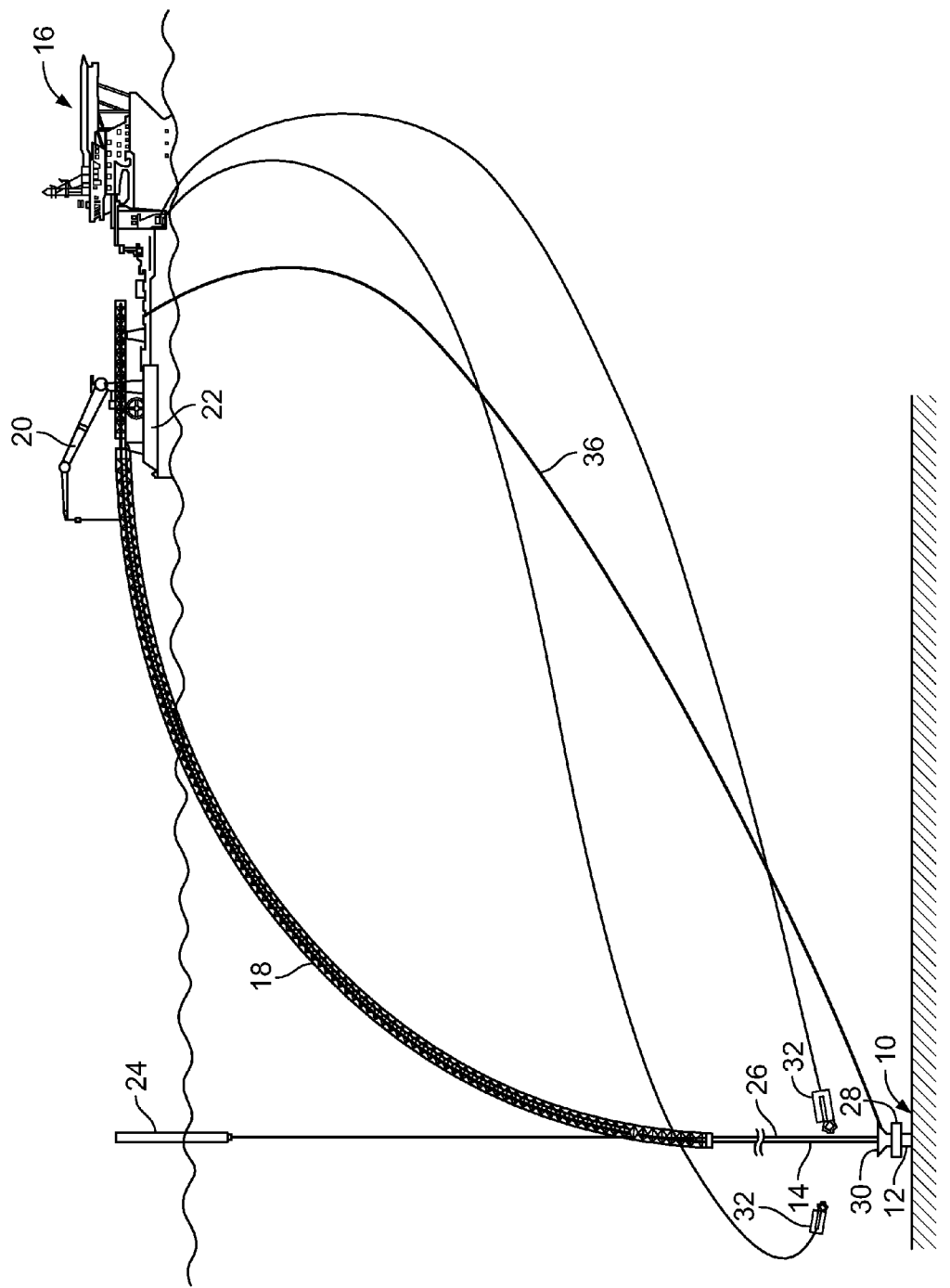
FIG. 1 is a schematic side view of an example well completion scenario having a vessel with a substantially horizontal stinger.

As seen in FIG. 1, the well 10 includes a wellhead 12 protruding from the underwater floor of the body of water. The well 10 (best seen in FIG. 4) includes a well bore that extends through the Earth into one or more subterranean zones of interest, and may be substantially vertical or deviated, for example to slant, deviate to horizontal, and/or be of another configuration. The well bore may be partially or fully lined with a casing. The well 10 is completed by installing a completion string 14, i.e., a string of tubing and equipment that will be used to transport fluids between the zones of interest and the wellhead, into the well bore.

The array of equipment and its arrangement in the completion string 14 varies from well to well. For example, a completion string often, though not necessarily, includes one or more lengths of tubing and devices configured to allow passage of fluids between the zones of interest and the interior bore of the completion string (e.g., apertured tubing, sand control screens, and/or other types of tubing), one or more sealing devices for sealing the annulus between the completion string and the casing and/or wall of the well bore (e.g., packers, plugs and/or other seals), one or more valves for controlling flow through the interior bore of the completion string, one or more sensors (e.g., pressure, temperature, flow and/or other sensors), and/or one or more control lines (e.g., hydraulic, electric, fiber optic and/or other types) for communicating between the surface and the equipment in the completion string and/or communicating between equipment in the completion string. The completion string can include other equipment, as well. The tubing and equipment are assembled together into a completion string 14 on the vessel 16 before being deployed.

The completion string 14 engages and seals with the wellhead 12 with a tubing hanger positioned at or near the uphole end (top) of the completion string. In certain instances, the well 10 is completed in two or more sections, for example, with a lower completion string and an upper completion string, and in certain instances with one or more intermediate completion strings between the upper and lower completion strings.

Figure 4:
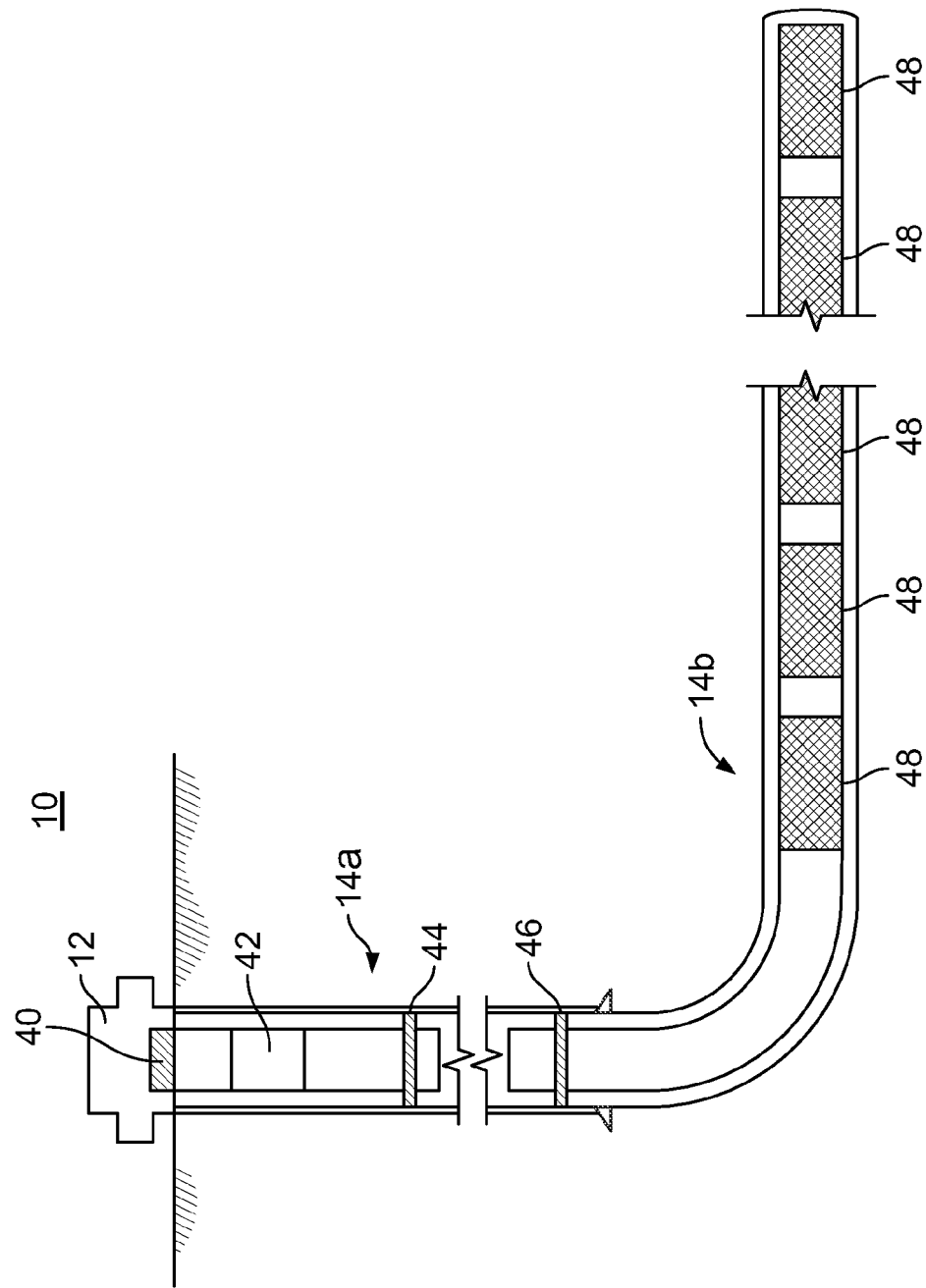
FIG. 4 is a schematic side view of an example completed well.

FIG. 4 shows one example configuration of completion string 14. The example completion string 14 has an upper completion string 14a and a lower completion string 14b. The upper completion string 14a includes a tubing hanger 40 engaged and sealing with the wellhead 12. The upper completion string 14a includes, among other things, a subsea safety valve 42 generally near the uphole end of the string 14a and a packer 44 generally near the downhole end of the string. The lower completion string 14b includes, among other things, a packer 46 generally near the uphole end of the string 14b and a plurality of sand control screens 48 in the subterranean zone of interest. Many other configurations of completion string are within the concepts described herein.

In accordance with the concepts herein, the completion string 14 is deployed from a stinger vessel 16 on a stinger 18 that is mounted to the vessel (e.g., from the stern, bow, side and/or another location of the vessel) and extends laterally outward therefrom and curves downward toward the wellhead 12. The stinger 18 supports the weight or a majority of the weight of the completion string 14 and controls its bend radius, and thus maximum stress, to maintain stresses in the completion string 14 below a specified threshold, for example, to prevent overstress in the completion string. In one example, the threshold is a maximum stress, at which the completion string will fail (e.g., collapse, plastically deform beyond an acceptable limit, and/or other failure), less a safety factor. The stinger 18 is long enough such that the lower end of the stinger 18, and the exit of the completion string 14 from the stinger 18, is in a vertical or near-vertical condition. Thus, it requires no immediate "management" of the orientation of the completion string 14 to avoid unacceptable stresses in the completion string 14. The stinger 18 also serves to protect the completion string 14 during deployment, in contrast to on surface deployment that would expose the completion string 14 to stress from water flow, wind, and waves during towing and deployment.

In certain instances, the stinger 18 is buoyant to partially or to completely support the completion string's weight. The completion string 14 is carried by a running string, a string of tubing coupled to the completion string 14 that is used to lower the completion string 14 into the well 10. In certain instances, the completion string 14 is an upper and/or intermediate completion string that is being deployed uphole from a lower completion string already in the well 10, for example, placed by a drilling rig used in drilling and casing the well 10.

The stinger vessel 16 can be a relatively low cost vessel (e.g., low cost to hire) with the stinger 18 and tubular handling equipment (for loading and making/breaking joints of the completion string 14 onto the stinger 18) added as one or more removable modules or as a permanent installation to the vessel. The vessel can have a crane 20 to deploy and retrieve the stinger 18. In certain instances, the crane 20 is heave-compensated to facilitate use of the crane 20 to deploy and retrieve other equipment to and from the wellhead 12. The vessel 16 can be a single hull or multi-hull vessel, for example having a V-hull or the like, or the vessel 16 can be a flat bottomed, ocean-going barge. In certain instances, the vessel 16 is configured with dynamic positioning capability to allow the vessel to remain in a specified location proximate the wellhead 12 while completing the well. In instances where the vessel 16 lacks dynamic positioning capability, for example as is common with barges, the dynamic positioning (and locomotion, if needed) can by supplied by one or more ocean-going tugboats with dynamic positioning capability.

In certain instances, the vessel 16 can be less than 400 feet (122 meters) long. Such smaller vessels tend to be more numerous, and thus more likely available and easier to schedule, as well as less expensive than larger vessels and drilling rigs. Some examples of suitable vessels include a platform supply vessel (typically approximately 200-250 feet/61-76 meters long and mono-hull), a subsea, umbilicals, risers and flowlines (SURF) vessel (typically approximately 250-350 feet/76-107 meters long and mono-hull), a light intervention vessel (typically approximately 300-400 feet/91-122 meters long and mono-hull). Other examples exist and are within the concepts described herein.

As seen in FIG. 1, in certain instances, the stinger 18 can extend substantially horizontally from the vessel 16 and curves downward toward the wellhead 12. The completion string 14 is assembled from joints of tubing and equipment, horizontally onto the stinger 18 as it is being deployed from the vessel 16. The completion string 14 leaves the vessel horizontally and then curves downward on (over or through, depending on the configuration) the stinger 18 toward the wellhead 12. Because the completion string 14 is assembled while at the vessel 16 and while it is being deployed on the stinger 18, the time that the completion string 14 is exposed to weather and sea conditions prior to installation is reduced as is the risk of damaging the completion string 14.

A horizontal configuration of stinger would be fairly long relative to the vessel size. In one example, a stinger 18 with a constant 10 degrees/100 feet (30 meters) bend radius would be 900 feet (275 meters) long and would extend 573 feet (175 meters) horizontally from the stern of the vessel 16. Similarly, the water depth at the end of the stinger would be 573 feet (175 meters) vertically. In another example, a stinger 18 with a constant 6 degree/100 feet (30 meters) bend radius stinger would be 1500 feet (457 meters) long and would extend almost 1000 feet (305 meters) horizontally and below the vessel 16. In order for the extension horizontally and vertically from the vessel to be less than 300 feet (91 meters), the bend radius must be almost 20 degrees/100 feet (30 meters) and the stinger 18 length would be over 450 feet (137 meters). In certain instances, these stinger lengths can be shorter, as the last 5-15 degrees of deviation of the completion string from a vertical orientation may not require being guided by the stinger to avoid over stress.

Figure 2:
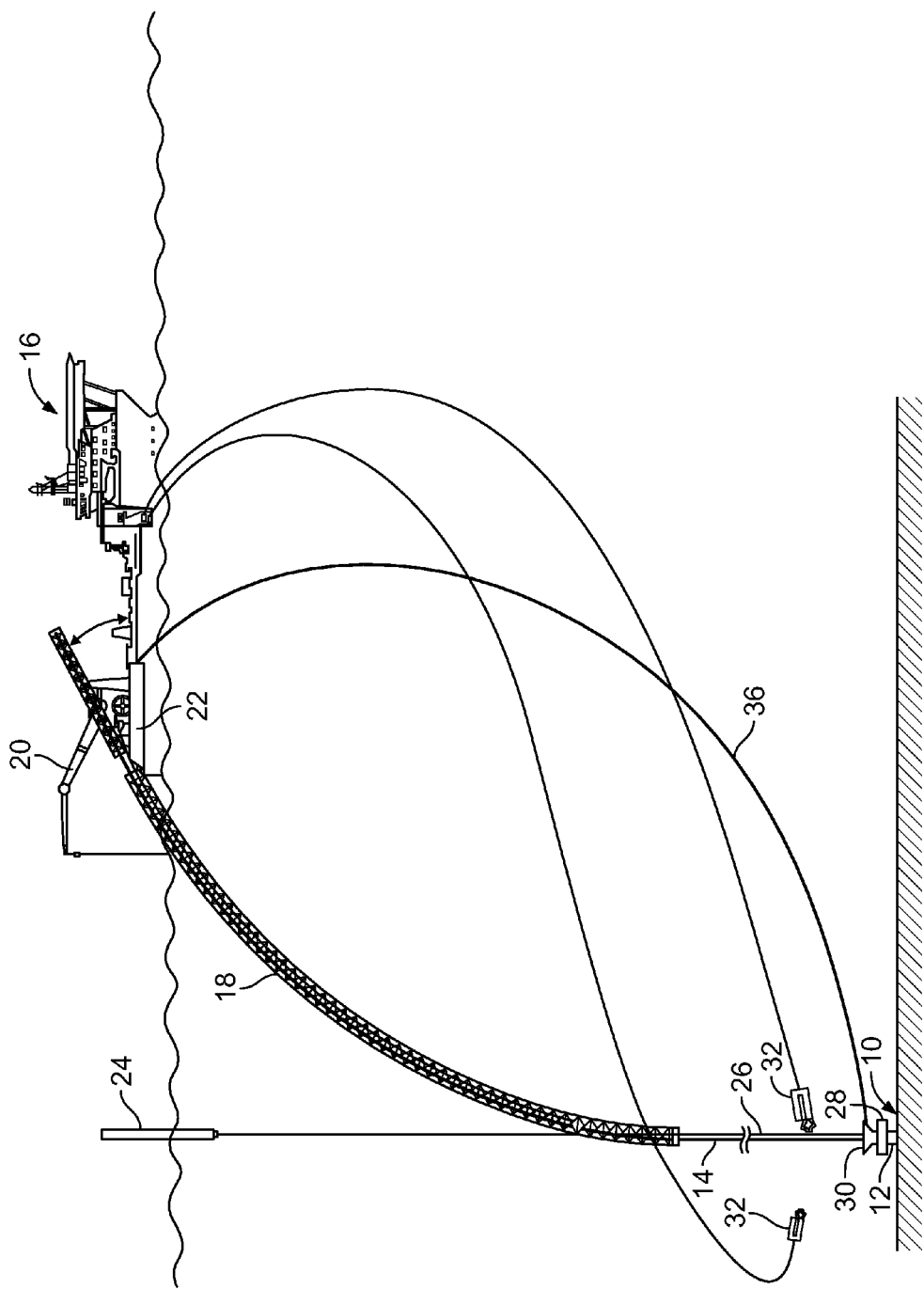
FIG. 2 is a schematic side view of an example well completion scenario having a vessel with a stinger at an acute angle relative to horizontal.

As seen in FIG. 2, in certain instances, the stinger 18 can extend from the vessel 16 at an angle relative to horizontal and curve downward toward the wellhead 12. For example, the stinger 18 can be oriented at an acute angle, at an angle between 15 and 45 degrees, at approximately 30 degrees and/or another angle from horizontal. The completion string 14 is assembled by make-up equipment at the angle onto the stinger 18, and deployed from the vessel at this angle to curve downward on the stinger 18 toward the wellhead 12. Using this angled configuration, the stinger 18 can be considerably shorter than the horizontal configuration, although still fairly long relative to the vessel size. In one example, a stinger 18 with a constant 10 degrees/100 feet (30 meters) bend radius would be 600 feet (183 meters) long to completely reach a vertical orientation, but would extend less than 300 feet (91 meters) horizontally from the stern of the vessel 16; the water depth at the end of the stinger 18 would be slightly less, around 400 feet (122 meters) vertically. If the near-vertical portion of the stinger 18 is eliminated, the length could be reduced to around 450-550 feet (137-168 meters), the water depth at the end could be only about 300-350 feet (91-107 meters) and the horizontal extension from the vessel could be only about 250 feet (76 meters). A 6 degree/100 feet (30 meters) bend radius stinger could be about 750-900 feet (229-274 meters) long and would extend about 450-500 feet (137-168 meters) horizontally and about 550-650 feet (168-198 meters) below the vessel 16. Because the angled stinger 18 can be shorter for a given bend radius, the angled stinger 18 extends shallower into the water, and thus can be used in shallower water depths than an analogous horizontal stinger configuration.

In either configuration, horizontal or angled, full deployment of the stinger 18 from the vessel 16 is preferably done while out of port, for example, while enroute to the well 10, once at the well 10 and/or at another time. The crane 20 on board the stinger vessel 16 can be used to aid in deploying the stinger 18. In certain instances, the stinger 18 is articulated so that it can fold for transport or storage on the vessel 16. Alternatively or additionally, the stinger 18 is transported and stored in two or more pieces on the vessel 16, and the pieces assembled as the stinger 18 is deployed from the vessel 16.

In certain instances, the stinger 18 can be continuously articulated along its length and up to the end that attaches to the vessel 16 so as to more easily bend. Such an articulated configuration can reduce stresses on the vessel 16 caused by relative movement between the stinger 18 and the vessel 16, for example, due to wind and wave action.

In certain instances, the stinger 18 can have a buoyancy at its end furthest from the vessel 16 that is such that the stinger 18 initially floats and then submerses when the completion string 14 is deployed on the stinger 18. The end nearest the vessel 16 can be more buoyant to aid in supporting or completely support the weight of the completion string 14. The stinger 18 buoyancy can be changed, for example by adding/removing, resizing and/or ballasting/deballasting buoyancy modules, to account for different weight completion strings 14. Buoyancy is less important for the angled stinger configuration (FIG. 2) than the horizontal stinger configuration (FIG. 1), but the angled stinger configuration having neutral or positive buoyancy is still advantageous.

In one example, the buoyancy of the stinger 18 is controlled with one or more buoyancy modules 24 which, initially before deploying the completion string 14, are only partially immersed in the water and which are pulled further into the water when the completion string 14 is deployed on the stinger 18, thus supporting the stinger 18 with greater buoyancy. Although there is a considerable variance in the weight of completion strings 14 (due to their varying configurations from well to well), many completion strings weigh less than 150,000 pounds (6,800 kilograms). For example, a void chamber in the shape of cylinder 30 feet (9 meters) long and 10 feet (3 meters) in diameter would create approximately 150,000 pounds force (68,038 kilograms) of buoyancy. Such a cylinder with void chamber, tethered to the stinger 18 with the cylinder axis perpendicular to the water surface, would present only a small side surface exposed to wind and waves, and yet have sufficient variable buoyant force to support all or a large proportion of the weight of the completion string 14. Longer and smaller diameter modules would be correspondingly less affected by wind and waves, but would supply less buoyant force as more of the module is immersed in the water.

In certain instances, the buoyancy module can be fitted with a mechanism for controlling the tether length, and thus the buoyancy of the stinger 18 can be varied both actively and passively. In one example, the tether length can be controlled by a reel 22 (e.g., powered electrically, hydraulically, and/or otherwise) on the host vessel and connected to the buoyancy module by one or more cables that traverse the stinger 18. In another example, the reel can be on the stinger 18 or on the buoyancy module itself, and controlled from the stinger vessel 16 via an umbilical line and/or wirelessly. The reel can be independently powered (e.g., by battery on the stinger 18 and/or buoyancy module) or powered via the control line. Alternatively, or additionally, the stinger buoyancy can be controlled by a ballasting/deballasting system on the stinger 18 (e.g., water tanks with pumps for pumping water into and out of the tanks, and/or another ballasting/deballasting system) and controlled from the stinger vessel 16.

In certain instances, the lower end of the stinger 18 (the end furthest from the vessel 16) can be positioned relative to the wellhead 12 using a buoyancy module 24 tethered to, or near to, the lower end of the stinger 18. In one embodiment the buoyancy module 24 is additionally tethered (by tether 26) to a fixed location underwater, for example, tethered to, or near to (e.g., to another piece of equipment and/or the sea floor), the wellhead 12. In such a configuration, the buoyancy module 24 is configured to keep the tether 26 in tension, thus fixing the relative distance between the lower end of the stinger 18 and the wellhead 12. The buoyancy module 24 and tether 26 can be coupled to the stinger 18 and the fixed location in a single operation, or the buoyancy module 24 and tether 26 can be coupled to the fixed location first and the stinger 18 coupled to the tether 26 at some later time.

Fixing the relative distance between the stinger 18 and wellhead 12 facilitates insertion and running of the completion string 14 into the wellhead 12. Movement of the vessel 16 and the upper end of the stinger 18 (the end nearest the vessel 16) relative to the wellhead 12 can be accommodated through changing flexure in the stinger 18 and completion string 14. Additionally, by fixing the lower end of the stinger 18 to a fixed location, movement between the lower end of the stinger 18 and the wellhead 12 is eliminated, thus also eliminating movement between the upper end of the completion string 14 (or the running string used in deploying the completion string) and the vessel 16. As a result, the tubular handling equipment on the vessel 16 need not be heave compensated.

As discussed above, the vessel 16 is provided with tubular handling and make-up equipment used to assemble the completion string 14 onto the stinger 18 and deploy the completion string 14. In a horizontal stinger 18 configuration (FIG. 1), the tubular handling and make-up equipment is mounted horizontally or substantially horizontally on the deck of the vessel 16, creating a low center of gravity as compared to systems with vertical tower systems. In an angled stinger configuration (FIG. 2), the tubular handling and make-up equipment is still low and has a lower center of gravity than a vertical configuration. If the stinger is articulated at the point of attachment to the vessel 16, the tubular handling system can accommodate movement between the vessel 16 and the stinger 18 so as to prevent unacceptable bending stresses being applied to the completion string 14 at or near the connection point of the stinger 18 to the vessel 16. In certain instances, the tension and compression load bearing component of the tubular handling assembly (i.e., the derrick-like component) can be integrated with the stinger 18 (e.g., essentially as an extension to the stinger 18) to help control such stresses. In certain instances, the tubular handling assembly can resemble a snubbing unit.

The tubular handling system is configured to have sufficient pulling (i.e., tension) and pushing (i.e., compression) capability to overcome friction of the completion string 14 with the stinger 18 while deploying the completion string 14 or while retrieving the completion string 14 (e.g., if the installation were to be aborted). Some natural heave compensation is achieved due to flexure of the stinger 18. In certain instances, the tension aspect can additionally be heave-compensated to enable easier assembly stab-in and tubing hanger landing at the wellhead 12. In configurations having a buoyancy module 24 tethered to a fixed location at or near the wellhead 12, heave compensation by the tubular handling equipment is less needed.

As depicted, the stinger 18 is a truss, but other different configurations would likewise work. A "liner" of a tube, for example an American Petroleum Institute (API) standard casing, can be used as a guide through the stinger 18 for the completion string 14. The liner can be affixed to the remaining structure of the stinger 18, or alternatively, it can be deployed on the stinger 18 first, with the completion string 14 deployed second, through the liner. The liner can be whole (i.e., circular in cross-section) or a trough like a cut-away portion (i.e., semi-circular, V-shaped and/or other partial cross-section). In certain instances, the liner can be a similar size, especially with respect to internal diameter, as the casing inside the wellbore through which the completion string 14 is being installed. In certain instances, the liner can have a special friction-reducing internal coating to reduce the friction with the completion string 14. The stinger 18 (and if used, the liner) can be large enough to allow the passage of the tubing hanger at the upper end of the completion string 14.

Figure 5:
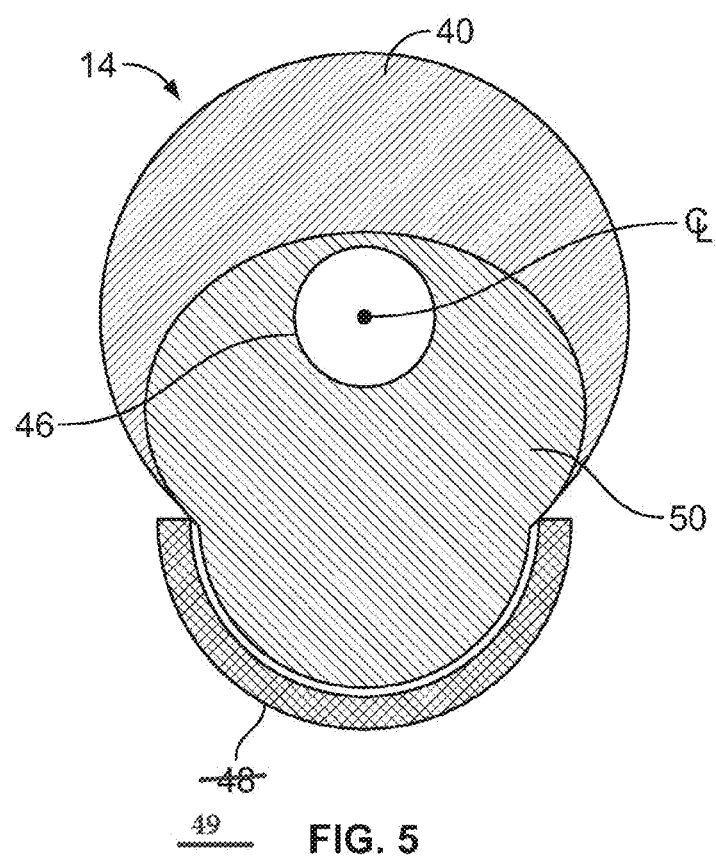
FIG. 5 is a schematic end cross-sectional view of a completion string with a guide device taken through the guide device.

In the case of a trough-like configuration, the internal radius can be smaller than the outer radius of the tubing hanger 40 of the completion string 14, and the tubing hanger 40 deployed substantially above a trough 49 while still being inside the structure of the stinger 18. In such instances, the completion string 14 can be provided with a guide device that facilitates transition of the tubing hanger 40 onto the trough 49. For example, as seen in FIG. 5, one example guide device 50 can be a conical or semi-conical construction positioned in the completion string 14 forward of the tubing hanger 40. The outer perimeter of the guide device 50 initially corresponds to the outer diameter of the completion string 14, but nearer the tubing hanger 40 corresponds to the outer diameter of the tubing hanger 40. In certain instances, the conical (or near conical) construction can be laterally offset from the centerline of the completion string 14. As guide device 50 comes onto the trough 49, the conical (or near conical) shape lifts the completion string 14 to guide the outer diameter of the tubing hanger above the trough 49.

Figure 6:
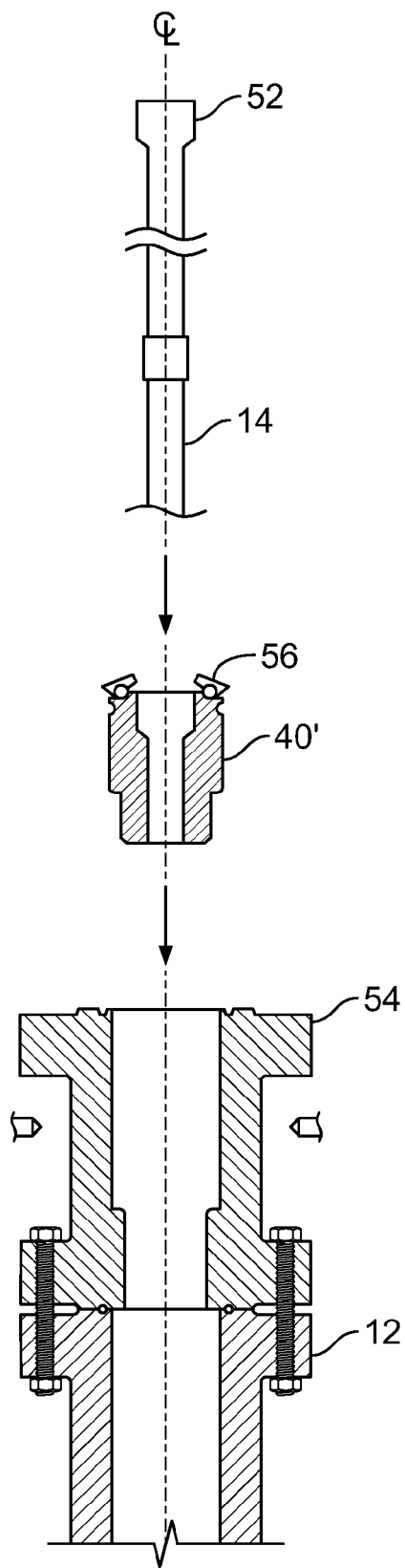
FIG. 6 is a schematic side view of an example arrangement of completion string, tubing hanger, and receiver.

Alternatively, a special tubing running tool, adapted at the wellhead (or at the lower end of the stinger, or anywhere between the end of the stinger and the wellhead) to become the tubing hanger, can be used to deploy the completion string 14 through the stinger 18. FIG. 6 shows an example configuration of completion string 14 and tubing hanger 40' of this type. The tubing hanger 40' is releasably attached at the lower end of the stinger 18, rather than being run through the stinger 18 as part of the completion string 14. In deployment, the completion string 14 is run through the stinger 18 until a profile 52 on the completion string 14 lands in, and grips and seals with, the tubing hanger 40'. Thereafter, the tubing hanger 40' is carried on the completion string 14 to land, grip and seal with a receiver 54 on the wellhead 12. The tubing hanger 40' can have dogs and/or another mechanism 56 to lock into the receiver 54.

As an alternative to, or in addition to, the use of a liner in the stinger 18 as a guide, a moving continuous track structure can be incorporated into one or more portions of the stinger 18. For example, portions of the stinger 18 nearer to the vessel 16 impart the greatest side forces to the completion string 14, and would benefit from reduced friction that can be provided by a moving track. The moving track can enable reduced friction as the completion string 14 passes over the stinger 18, thus reducing wear on the completion string 14 and reducing the forces required to deploy or retrieve it.

In any of the configurations above, a centralizer or other guiding tool can be added to the completion string 14 just below and/or above the larger diameter tubing hanger to ensure that tubular stresses are controlled at and near to the tubing hanger while the tubing hanger is passing through the stinger 18.

A shear and sealing device 28 is mounted to the wellhead 12 (or horizontal Christmas tree, if used) for emergency termination of the completion process. The shear and sealing device 28 is configured to cut the completion string 14 and seal the opening of the well 10 should the completion process need to be stopped for any reason without retrieving the completion string 14. For example, the shear and sealing device 28 can be actuated in response to an undesired drift-off or drive-off of the vessel 16 due to loss of dynamic positioning capability or weather conditions, or if the completion string 14 were to get stuck before installation was complete. In certain instances, the shear and sealing device 28 can be installed on the wellhead 12 via a working string deployed on the stinger 18, or with a heave-compensated crane 20 on the vessel 16 or on a second vessel. The shear and sealing device 28 is controlled via an umbilical line from the vessel 16. The shear and sealing device 28 can have or be installed with funnel 30 and/or other guiding component(s) to aid in positioning the bottom end of the completion string 14 for stab-in to the wellhead 12.

Figure 3:
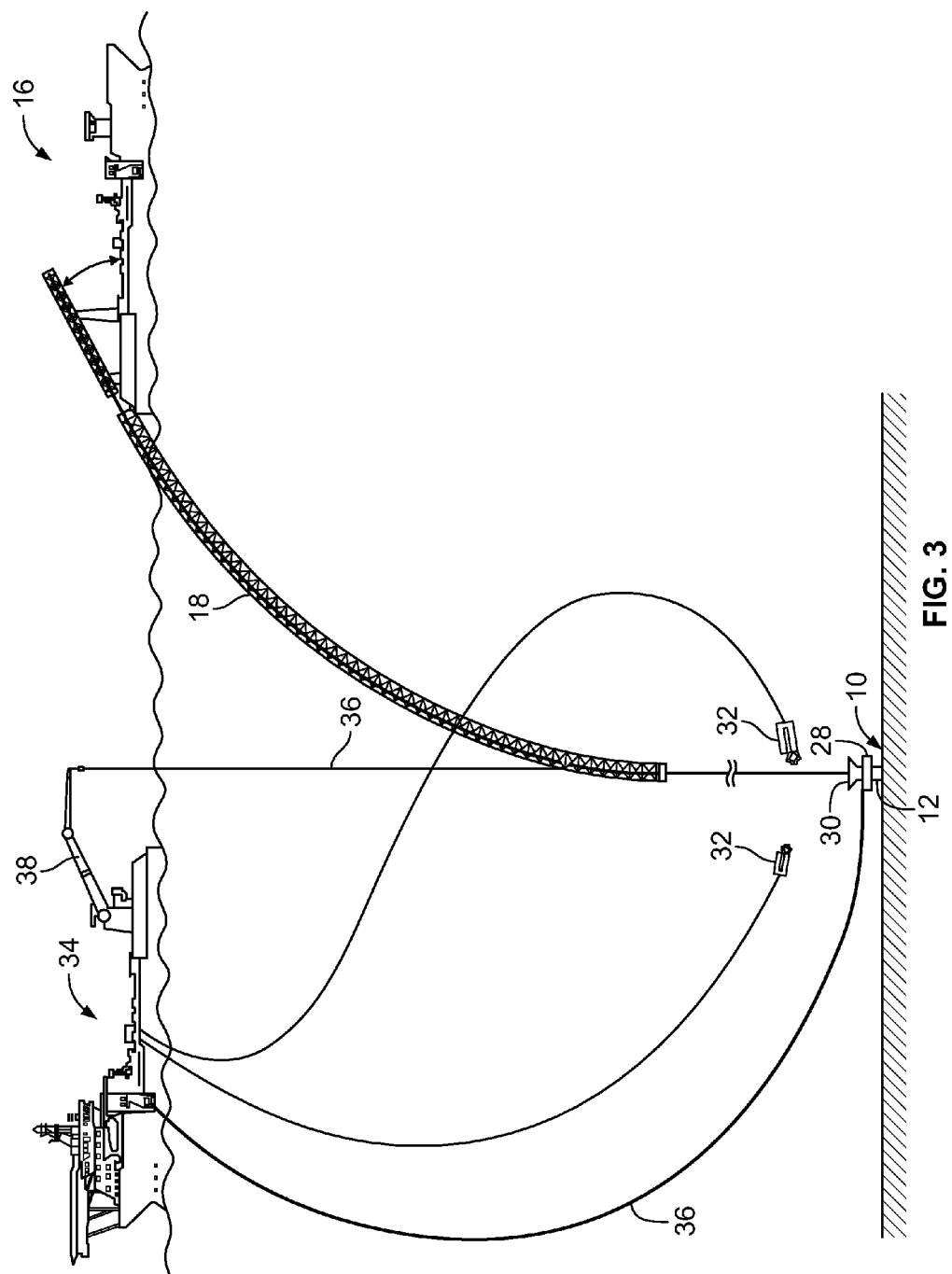
FIG. 3 is a schematic side view of an example well completion scenario having a vessel with a stinger at an acute angle relative to horizontal and having a second assisting vessel.

Stab-in of the completion string 14 can be monitored and possibly aided by physical manipulation by one or more ROVs 32 controlled from the vessel 16 and/or another vessel. The entire installation can be monitored by the ROVs 32, which can also perform other standard activities such as disconnecting the completion string running string once the tubing hanger is landed, or contingency activities such as operating the shear/seal device. Positioning the vessel 16 upwind and/or up-current from the wellhead 12 can facilitate aligning the completion string 14 for stab-in. Also, some station keeping ability can be fitted to the stinger 18 itself, or alternatively a second vessel 34 (FIG. 3) can be used to help manage the position of the stinger 18. If used, such a second vessel 34 can be closer to the wellhead 12 than the stinger vessel 16 itself, and therefore the second vessel 34 might be a better host for the ROVs 32 used in the completion process than the stinger vessel 16. If used, a second vessel 34 can both support the stinger 18 and help manage its position using a cable 36 attached at or near to the lower end of the stinger 18. The cable 36 can be controlled from the second vessel 34 via a heave-compensated crane or winch 38 which would maintain a constant tension on the cable 36. In the case of a constant tension cable 36, the cable 36 is attached not only to the stinger 18, but also attached to a fixed location at or near the wellhead 12, thus eliminating relative movement between the lower end of the stinger 18 and the wellhead 12.

A number of embodiments have been described. Nevertheless, it will be understood that various modifications may be made. Accordingly, other embodiments are within the scope of the following claims.

What is claimed is:

1. A method of completing an underwater well, comprising:
    extending an elongate stinger laterally outward from a vessel positioned at the water surface, the stinger extended to curve downward toward a wellhead of the well;
    deploying a well completion string from the vessel on the stinger while supporting the well completion string to curve outward and downward from the vessel toward the wellhead, the stinger comprising a trough that supports and lifts a tubing hanger of the well completion string to pass above the trough while the stinger supports the well completion string;
    supporting the stinger with a buoyant device coupled to the stinger and residing in the water; and
    guiding the well completion string into the wellhead.

2. The method of claim 1, where the buoyant device is coupled about an end of the stinger distal from the vessel.

3. The method of claim 1, where the buoyant device is coupled to the stinger at a location that is moveable along the length of the stinger and the method further comprises adjusting the supporting of the stinger by moving the location at which the buoyant device is coupled.

4. The method of claim 1, where the buoyant device is coupled to the stinger with a tether and the method further comprises adjusting the length of the tether to adjust the support of the stinger.

5. The method of claim 1, further comprising supporting the stinger using a cable to a second vessel.

6. The method of claim 1, further comprising coupling a tether line to a location fixed relative to the wellhead and coupling the stinger to the tether line.

7. The method of claim 6, where the tether line is coupled to the buoyant device that, by its buoyancy, holds the tether line taut.

8. The method of claim 1, where deploying a completion string over the stinger comprises supporting the completion string against bending overstress with the stinger.

9. The method of claim 1, where guiding the completion string into the wellhead comprises guiding the completion string into the wellhead with a guide funnel at the wellhead.

10. The method of claim 1, where the stinger extends substantially horizontally outward from the vessel; and
where deploying a completion string from the vessel comprises deploying the completion string substantially horizontally from the vessel.

11. The method of claim 1, where the stinger extends at an acute angle from horizontal and outward from the vessel; and
deploying a completion string from the vessel comprises deploying the completion string at the acute angle from horizontal.

12. The method of claim 1, where the completion string comprises an upper completion string adapted to reside uphole from a lower completion string in the well.

13. The method of claim 1, where extending an elongate stinger laterally outward from a vessel positioned at the water surface comprises extending an elongate stinger laterally outward from a vessel of less than 400 feet (122 meters) long positioned at the water surface.

14. A method, comprising:
supporting, from a vessel positioned at a surface of a body of water, a well string against bending stress greater than a specified bending stress, the well string configured to complete an underwater well, the vessel comprising a single hull vessel of less than 400 feet (122 meters) long;
lowering the well string towards a wellhead of the underwater well while supporting the well string against bending stress greater than the specified bending stress;
supporting, during deploying, the well string with a stinger by interfacing a guide device with a portion of the stinger that comprises a semi-circular or v-shaped cross section to lift a tubing hanger of the well string to pass above the portion of the stinger; and
stabbing the well string into the wellhead and coupling the well string to the wellhead.

15. The method of claim 14, wherein supporting the well string against bending stress greater than a specified bending stress comprises supporting the well string with a stinger extending laterally outward from the vessel.

16. The method of claim 14, wherein stabbing the well string into the wellhead comprises guiding the well string using a second vessel.

17. A system for completing a well, comprising:
a first vessel for floating on a water surface and having an elongate stinger that, when assembled, extends laterally outward therefrom and curves downward into the water toward a wellhead of the well;
an elongate well completion string comprising tubing and a tubing hanger for coupling with the wellhead, the stinger adapted to support the well completion string as the well completion string is deployed from the first vessel into the water toward the wellhead; and
a line extending from a crane on a second vessel and coupled to the stinger to provide support to the stinger,
where the stinger comprises a semi-circular or v-shaped member and the elongate well completion string further comprises a guide device, and the stinger is adapted to support the well completion string and interface with the guide device to lift the tubing hanger over the semi-circular or v-shaped member.

18. A system for completing a well, comprising:
a vessel for floating on a water surface and having an elongate stinger that, when assembled, extends laterally outward therefrom and curves downward into the water toward a wellhead of the well; and
an elongate well completion string comprising:
a tubing;
a tubing hanger for coupling with the wellhead; and
a guide that interfaces with an elongate trough of the stinger and lifts the tubing hanger to pass above the trough, where
the stinger is adapted to support the well completion string as the well completion string is deployed from the vessel through the water surface toward the wellhead, and the elongate trough receives and guides the well completion string.

19. The system of claim 18, further comprising a line extending from a crane on a second vessel and coupled to the stinger to provide support to the stinger.

20. The system of claim 18, where the stinger, when assembled, extends substantially horizontally from the vessel and curves downward into the water toward the wellhead of the well.

21. The system of claim 18, where the stinger, when assembled, extends at an acute angle from horizontal and curves downward toward the wellhead of the well.

22. The system of claim 18, where the tubing hanger is initially carried about an end of the stinger and is coupled to the remainder of the completing string when the completion string passes through the stinger.

* * * * *